UNITED STATES PATENT OFFICE.

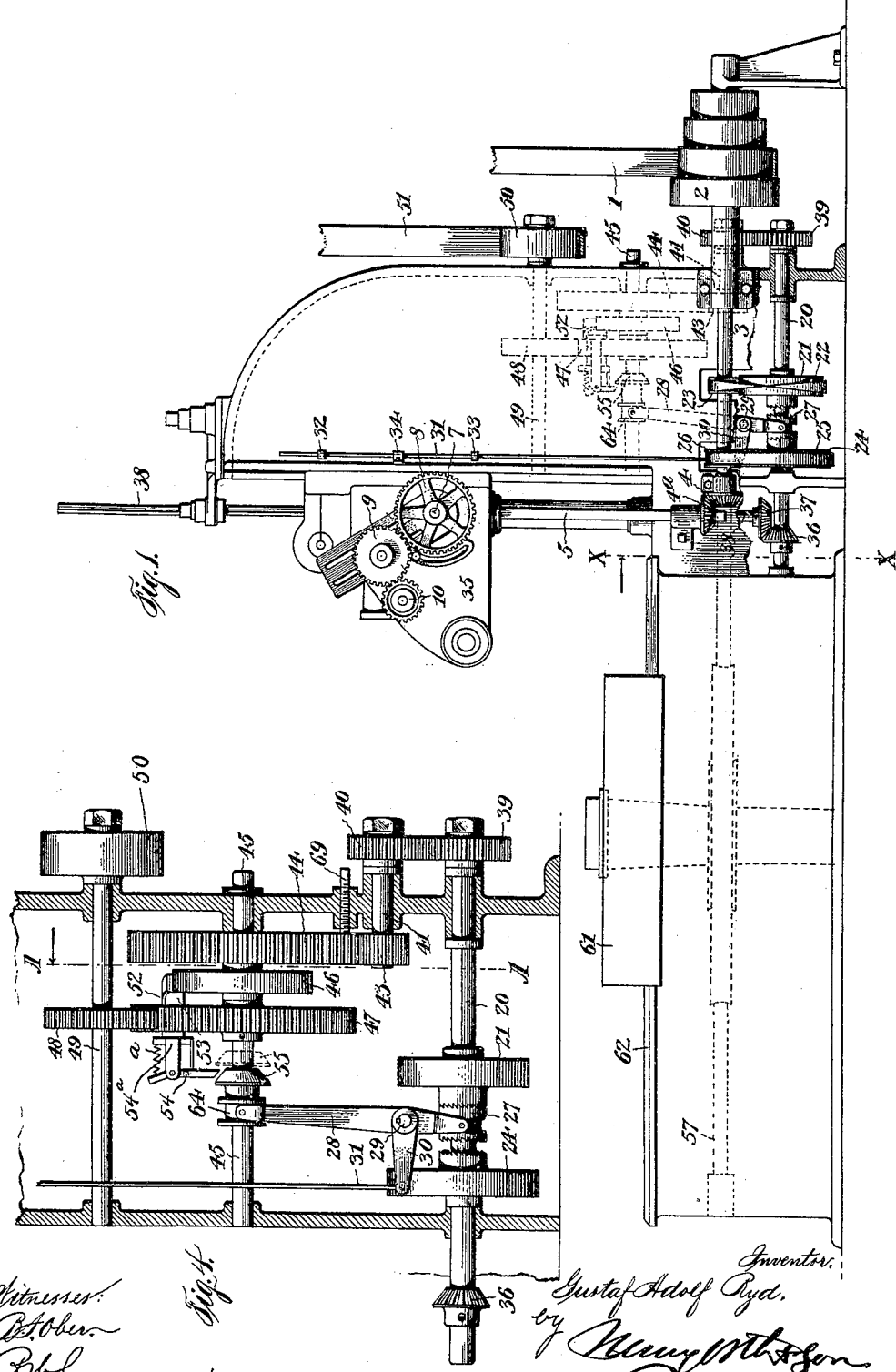

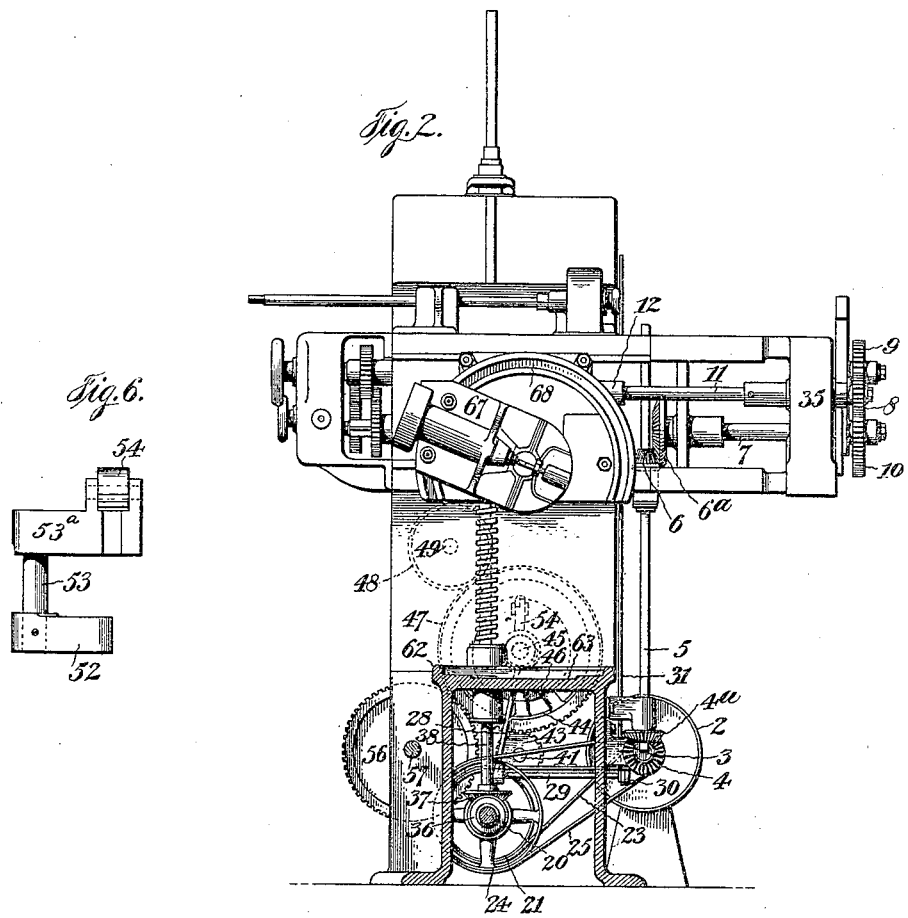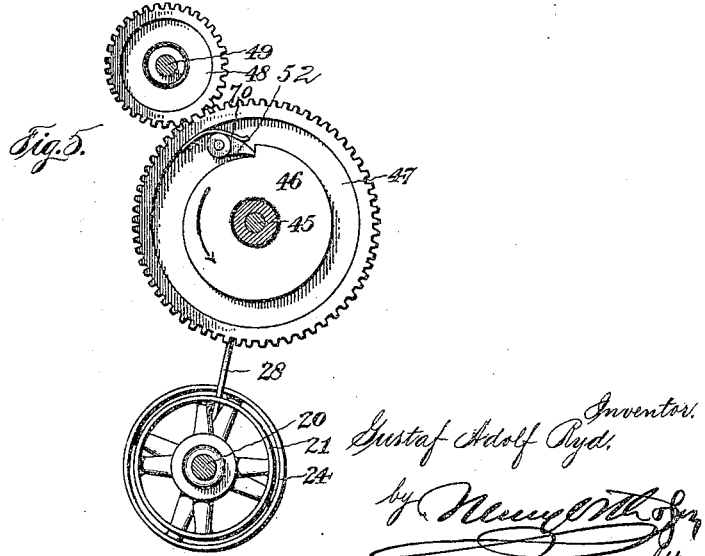

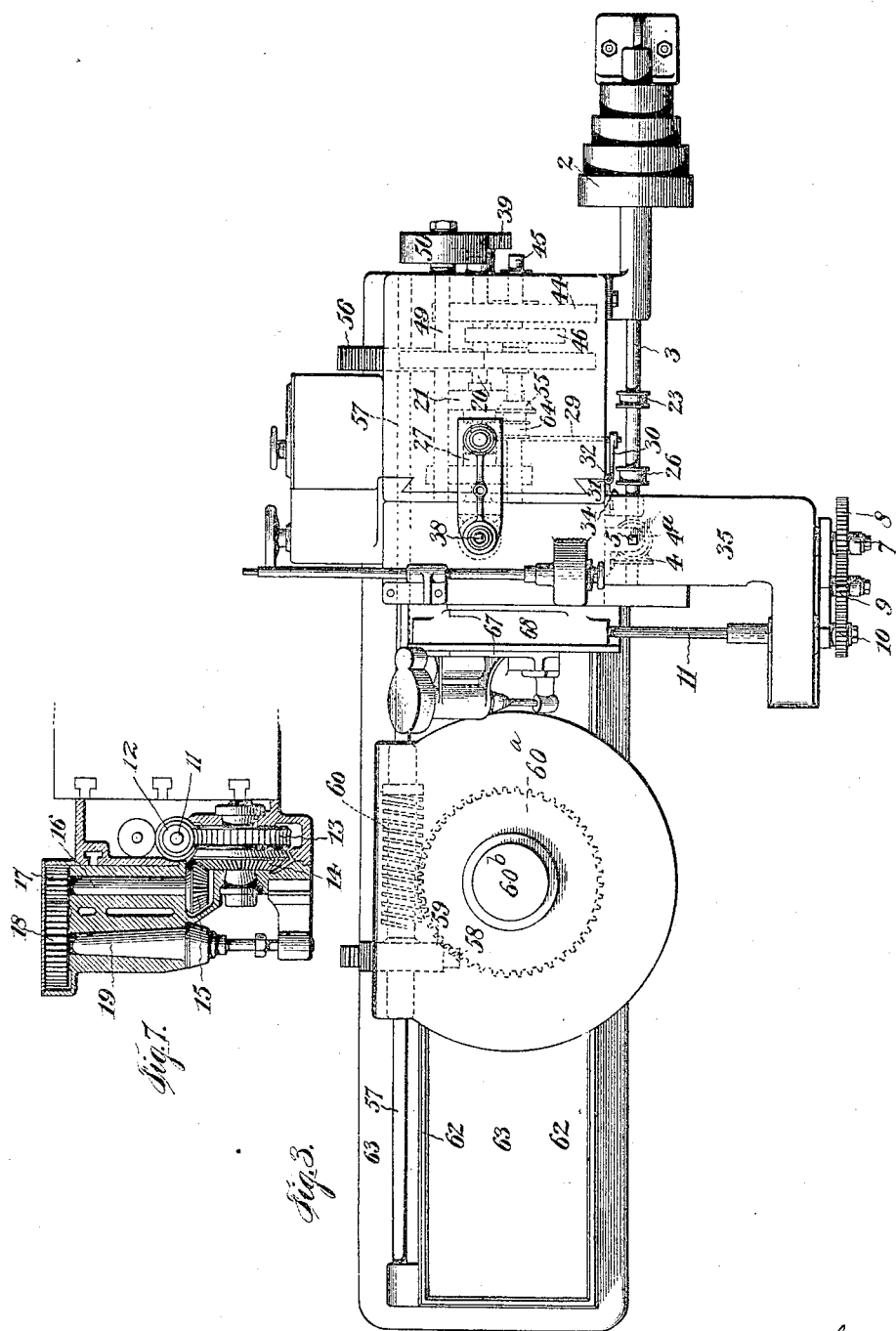

GUSTAF ADOLF RYD, OF STOCKHOLM, SWEDEN.

GEAR-CUTTING MACHINE.

No. 801,269.  Specification of Letters Patent.  Patented Oct. 10, 1905.

Application filed July 16, 1901. Serial No. 68,506.

*To all whom it may concern:*

Be it known that I, GUSTAF ADOLF RYD, a subject of the King of Sweden and Norway, residing at Stockholm, Sweden, have invented certain new and useful Improvements in Gear-Cutting Machines; and I do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

The present invention is an improvement in gear-cutting machines, and has for its object mechanism to cut worm-wheels of any desired size, provided the spacing and size of the teeth are the same for the different-size wheels, and the improvement is of such a nature that it can be readily applied to existing gear-cutting machines, thereby enabling them to cut worm-gears.

Referring to the drawings, in which like parts are similarly designated, Figure 1 is a side view. Fig. 2 is an end view of my machine, the table being in section on line X X of Fig. 1. Fig. 3 is a plan view. Fig. 4 is a side view of the changing mechanism. Fig. 5 is a section taken on the line A A of Fig. 4. Fig. 6 is a plan view of the pawls, and Fig. 7 is a section showing the tool-driving mechanism.

Referring to Figs. 1, 2, and 3, 3 is the power-shaft, on which is mounted a stepped pulley 2, driven by a belt 1 from a suitable source of power. On this shaft is a bevel-gear 4, operating one, 4ª, to drive the vertical shaft 5, said shaft 5 being vertically slidable through a bevel-gear 6, which transmits motion, by means of bevel-gear 6ª and counter-shaft 7, to gears 8 9 10 and shaft 11, carrying worm 12, that drives the worm-wheel 13 to impart motion to the cutting mechanism. This worm-wheel 13 drives a bevel-gear 14, that meshes with one, 15, on the shaft 16, having on its opposite end a pinion 17, that drives one, 18, on the tool-shaft 19, said tool-shaft designed to carry a suitable milling-tool.

20 is a shaft parallel with the driving-shaft 3 and carries a loose pulley 21, connected by a cross-belt 22 to a pulley 23 on the shaft 3. This shaft 20 also carries a loose pulley 24, connected by a belt 25 to a pulley 26 on the shaft.

Between the pulleys 21 and 24 is clutch 27 to engage either pulley, and thereby reverse the direction of rotation of shaft 20. This clutch is operated by a lever 28, fixed on a shaft or rod 29, to which is connected a crank-arm 30, operated by a rod 31.

On the rod 31 are adjustable stops 32 and 33, between which moves a tappet 34 on the vertically-movable carriage 35.

The shaft 20 has at one end a bevel-gear 36, gearing with one, 37, on a vertical feed-screw 38, that moves the carriage 35 up or down. On the other end of the shaft is a change-gear 39, meshing with one, 40, on a stub-shaft 41, that carries a pinion 43. This pinion 43 drives a gear-wheel 44, loose on a shaft 45, and moving with said gear-wheel 44 or secured to it is a snail-wheel 46, having a single step or an equivalent mechanism, such as a cam, a single-tooth wheel, and the like. Secured to the shaft 45 is a gear-wheel 47, that meshes with a pinion 48 on a shaft 49, and on the shaft 49 is frictionally held a pulley 50, driven constantly in one direction by a belt 51.

Pivotally mounted in the gear-wheel 47 is a pawl 52. (Shown in plan in Fig. 6.) This pawl is secured to one end of a short shaft 53, passing through and mounted in the gear-wheel 47, and said shaft carries an arm 53ª, on which is pivoted a spring-held pawl 54, the nose of said pawl being capable of moving out of its normal position from wheel 47 and is moved back into normal position by spring *a*. Said pawl 54 coöperates with a plain cone 55, loose on shaft 45 and connected to a spool 64, operated by the shift-lever 28. The cone acts as a cam to cam up the spring-held pawl 54 and its arm 53ª to lift the pawl 52 on the opposite side of the gear-wheel 47 out of engagement with the step on the snail-wheel 46, thereby disconnecting wheel 47 from its driving-train. The gear-wheel 47 engages with one, 56, on a shaft 57. On shaft 57 is fastened the pinion 58. This pinion is in engagement with a pinion 59, which is on the worm 60. The worm 60 gears with a worm-wheel 60ª on the spindle 60ᵇ, that supports the wheel-blank.

The tool-driving wheels and their carrier 67 are capable of an adjustment around the track 68, that has a shaft carrying the bevel-wheel 14 and worm-wheel 13 as a center.

The operation is as follows:

*The cutting of the worm-gear.*—In starting to cut a worm-gear the cone-wheel 55 must have the position shown in dotted lines, Fig. 4. The clutch-sleeve 27 is in contact with gear-wheel 24, which is thereby coupled to shaft 20. The vertically-movable carriage 35 is in its highest position. The motion from the power-shaft 3 is transmitted in three directions: first, to the milling-tool through the bevel-gears 4 4ᵃ and the vertical shaft 5 and, further, through all the gears in Fig. 7; second, to the vertically-movable carriage, through the pulley 26 on the power-shaft 3, the belt 25, the pulley 24, the shaft 20, bevel-gears 36 37, and feed-screw 38; third, to the gear-blank by means of pulley 26, belt 25, loose pulley 24, shaft 20, change-gear 39, gear 40, stub-shaft 41, pinion 43, gear-wheel 44, snail-wheel 46, pawl 52, gear-wheel 47, gear-wheel 56, shaft 57, and worm 60. Snail-wheel 46 is during this time in engagement with pawl 52, as shown in Fig. 5, and moves the pawl in front of it.

*The moving back of the milling-tool upward through the cut gear and the simultaneous turning back of the blank.*—When the cutting of the gear is done, the tappet 34 of the vertically-movable carriage 35 pushes against lower stop 33 on the rod 31. Clutch 27 is reversed and engages pulley 21, and the cone-wheel 55 is thereby pulled outward on shaft 45, (full-line position, Fig. 4,) whereby the pawl 54 turns out of the path of the cone-wheel, so that pawl 52 does not disengage snail-wheel 46. The motion from the power-shaft 3 is now transmitted by the pulley 23, cross-belt 22, and loose pulley 21, shaft 20, which thereby rotates in the opposite direction to that during the cutting, and consequently also gears 39 40, pinion 43, and gear-wheel 44 will rotate in an opposite direction, as well as the snail-wheel 46. Snail-wheel 46 is turned away from pawl 52. (See Fig. 5.) Snail-wheel 46, which is loose on shaft 45, cannot drive said shaft. The shaft is now driven by belt-pulley 50, which, encountering no resistance, transmits motion, through shaft 49 and pinion 48, to the wheel 47 to shaft 45, and this motion also takes place in the same direction as that of wheel 47. (See Fig. 5.) Pawl 52 is therefore in engagement with snail-wheel 46, although this, as mentioned before, moves away from the pawl. The consequence of this is that gear-wheel 47 and shaft 45 (from which motion is transmitted to the gear-blank) cannot revolve quicker than snail-wheel 46, and thereby the returning of the blank takes place with exactly the same speed as its turning forward during the cut.

*The moving forward of the blank a distance equal to the space of the teeth*—When the milling-tool has been moved back through the cut gear, tappet 34 pushes against upper stop 32 on rod 31. The cone 55 is thereby set inward on shaft 45 and engages pawl 54, so that pawl 52 is disengaged from snail-wheel 46. The pawl, no longer delayed by snail-wheel 46 and gear-wheel 47, which is still driven by pulley 50, is given the opportunity of rotating at a greater speed than the snail-wheel and makes one revolution independent of the snail-wheel to turn the wheel-blank through the space of one tooth ready for the next cut of the milling-tool. During the increased speed of wheel 47 the blank is turned forward a space equal to that of one tooth-space, since, as before mentioned, the wheel 47 transmits motion to the wheel-blank. The increased speed of wheel 47 continues during one turn. Before this turn is completed cone-wheel 55 has passed beyond pawl 54—that is, to the dotted position in Fig. 4—and pawl 52 has been returned inward, urged by the spring 70, Fig. 5, ready to grasp the notch in snail-wheel 46. At the same time, however, that cone-wheel 55 has taken the dotted position clutch 27 is reversed and has engaged pulley 24, so that the motion of the whole arrangement of transmission is reversed, and the parts are then ready to begin the cutting of another tooth. It is obvious that during the cutting of a gear pulley 50 glides on shaft 49, then rotating in an opposite direction to the pulley. The object of the pulley is partly to hold pawl 52 in the notch on snail-wheel 46 while this latter turns away from the pawl when the milling-tool is moved back through the cut gear and partly to revolve gear-wheel 47 with pawl 52 with greater speed when the blank is to be moved forward the space of one tooth.

The space between the teeth and the angle at which the milling-tool is set is dependent on the change-gears 40 39 between shafts 20 and 41. These latter gear-wheels may remain the same in cutting all kinds of worm gear-wheels, having the same space and angle, quite independent of the number of teeth.

The angle at which the milling-tool is set can of course be changed by rotating the head carrying the tool about the cone-wheel 13 on worm-wheel 14 as a center.

By removing one or both of the change-gears 39 and 40 and inserting the pin 69 to hold the wheel 44 stationary ordinary gear-wheels can be cut instead of worm-gears.

Having thus described my invention, what I claim as new therein, and desire to secure by Letters Patent, is—

1. In a gear-cutting machine, a driving-shaft, a vertically-movable tool-carriage driven therefrom; in combination with a wheel-blank-driving shaft, a shaft, a gear fixed thereon, a second gear-wheel meshing therewith and operating the wheel-blank-driving shaft, a worm thereon, a worm-gear carrying a wheel-blank spindle operated by the worm, a snail, a pawl on the first gear and engaging the snail to hold the shaft and snail together, a cone arranged to slide on the shaft, mechanism operated by the tool-carriage to shift the cone and lift the pawl out of engagement with the snail, and devices set in operation when said pawl is released to rotate said first gear-wheel to position the blank, substantially as set forth.

2. In a gear-cutting machine, a driving-shaft and a vertically-movable tool-carriage driven therefrom; in combination with a shaft, a gear fixed thereon, means operated by said gear for positioning the wheel-blank, a snail loose on said shaft, a gear-train intermediate the driving-shaft and snail to drive the latter, a pawl pivotally mounted in said gear and engaging the snail, mechanism operated by the tool-carriage to reverse the train of gearing and move the pawl out of engagement with the snail, and independently-operated devices for driving the gear after the pawl has been moved, substantially as set forth.

3. In a gear-cutting machine, a driving-shaft and a vertically-movable tool-carriage driven therefrom; in combination with a shaft, a gear fixed thereon, means operated by said gear for positioning the wheel-blank during and after a cut, a snail loose on said shaft, an intermediate shaft parallel with the driving-shaft, two pulleys loose thereon one operated by a direct and one by a crossed belt, a coupling-sleeve revoluble with this shaft and arranged to be connected to either of said pulleys, change-gear for transmitting motion between this shaft and snail, means for temporarily locking the gear-wheel to the snail to drive the former in one direction, mechanism automatically operated by the tool-carriage to unlock the gear-wheel and snail, and independently-operated devices to drive said gear-wheel in the other direction to reverse the rotation of the blank, to withdraw the tool from its kerf and to rotate the wheel-blank after the withdrawal of the tool into position for the cut on the next tooth, substantially as set forth.

4. In a gear-cutting machine, the combination with the driving-shaft, of a parallel shaft capable of being driven in opposite directions therefrom, a change-gear thereon, a stub-shaft, a second change-gear on the stub-shaft geared to the first change-gear, a gear-wheel loose on a shaft and driven by a pinion on the stub-shaft, a snail secured to said gear-wheel, a gear fixed on the shaft carrying the snail, a pawl on the last-mentioned gear in engagement with the snail, an independent shaft carrying a pinion to drive the gear-wheel fixed on the last-mentioned shaft, a friction-pulley, independently driven and on the shaft carrying the pinion, and mechanism for changing the rotation of the parallel shaft and disengaging the pawl from the snail, substantially as set forth.

5. In a gear-cutting machine, a driven shaft, reversing mechanism therefor, a reciprocable tool-carriage driven therefrom, in combination with a second shaft, a gear-wheel fixed thereon, change-gears connecting the said gear-wheel and driven shaft, a snail and a loose gear-wheel on the second shaft, means to rotate the wheel-blank from the fixed gear-wheel, a pawl pivoted in the gear-wheel fixed on the second shaft and adapted to engage the snail, and friction mechanism to independently drive the gear-wheel fixed on the second shaft in a direction opposite to that of the snail when unlocked from the snail by said pawl, substantially as set forth.

6. In a gear-cutting machine, the combination with a main driving-shaft, a second shaft, a reciprocable carriage driven therefrom, reversing mechanism on the second shaft, a third shaft, a gear-wheel loose thereon and driven from the second shaft, a gear-wheel fixed on the third shaft and means to periodically lock the loose gear-wheel to rotate with its shaft, friction mechanism to drive the gear-wheel fixed on the third shaft when unlocked, mechanism driven by said gear fixed on the third shaft to rotate the wheel-blank and means operated by the carriage to actuate the reversing mechanism.

7. In a gear-cutting machine, the combination with a driving-shaft, a reciprocable carriage, a pinion and reversing-shaft and a pulley frictionally held thereon; of a gear-wheel to rotate the wheel-blank in one direction and meshing with said pinion, a change-gearing to positively drive said gear-wheel, a pawl and a snail connecting the gear-wheel with the change-gearing, said change-gearing driven from the driving-shaft, clutch mechanism actuated by the carriage to reverse the direction of rotation of the change-gearing and connections therefrom to simultaneously trip the pawl, whereby the said pinion will rotate the gear-wheel at a greater speed than the change-gearing to rotate the wheel-blank in an opposite direction, substantially as set forth.

In testimony that I claim the foregoing as my invention I have signed my name in presence of two subscribing witnesses.

GUSTAF ADOLF RYD.

Witnesses:
K. KALLENBERG,
A. NORDBLOM.